United States Patent
Guichard et al.

(10) Patent No.: US 9,755,959 B2
(45) Date of Patent: Sep. 5, 2017

(54) DYNAMIC SERVICE PATH CREATION

(71) Applicant: Cisco Technology, Inc., San Jose, CA (US)

(72) Inventors: James Guichard, New Boston, NH (US); Paul Quinn, San Francisco, CA (US); Surendra Kumar, San Ramon, CA (US); Govind P. Sharma, Union City, CA (US); Abhijit Patra, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 958 days.

(21) Appl. No.: 13/944,050

(22) Filed: Jul. 17, 2013

(65) Prior Publication Data

US 2015/0026362 A1    Jan. 22, 2015

(51) Int. Cl.
*G06F 15/173* (2006.01)
*H04L 12/725* (2013.01)
*H04L 29/08* (2006.01)

(52) U.S. Cl.
CPC .............. *H04L 45/30* (2013.01); *H04L 67/18* (2013.01)

(58) Field of Classification Search
CPC .......... H04L 45/30; H04L 67/00; H04L 67/16
See application file for complete search history.

(56) References Cited

U.S. PATENT DOCUMENTS

| | | | |
|---|---|---|---|
| 7,558,261 B2 | 7/2009 | Arregoces et al. | |
| 7,571,470 B2 | 8/2009 | Arregoces et al. | |
| 7,610,375 B2 | 10/2009 | Portolani et al. | |
| 7,643,468 B1 | 1/2010 | Arregoces et al. | |
| 7,657,940 B2 | 2/2010 | Portolani et al. | |
| 8,311,045 B2 | 11/2012 | Quinn et al. | |
| 8,442,043 B2 | 5/2013 | Sharma et al. | |
| 2003/0061367 A1* | 3/2003 | Shah ...................... | H04L 47/10 709/230 |
| 2006/0092950 A1 | 5/2006 | Arregoces et al. | |
| 2006/0095960 A1 | 5/2006 | Arregoces et al. | |
| 2008/0177896 A1 | 7/2008 | Quinn et al. | |
| 2010/0165985 A1 | 7/2010 | Sharma et al. | |
| 2015/0003455 A1* | 1/2015 | Haddad .................. | H04L 45/38 370/392 |

OTHER PUBLICATIONS

Rosen, et al., "BGP/MPLS IP Virtual Private Networks (VPNs)," Network Working Group, RFC 4364, Feb. 2006, pp. 1-47.

* cited by examiner

*Primary Examiner* — Ryan Jakovac

(74) *Attorney, Agent, or Firm* — Edell, Shapiro & Finnan, LLC (57) ABSTRACT

Presented herein are techniques for dynamic creation of a unique service path for a service chain. In one example, a service controller and a plurality of service nodes are provided, each service node configured to apply a service function to traffic that passes through the respective service node. The service controller defines a service chain identifying a set of service functions and an order in which they are applied. The service controller receives an indication that the service chain has been instantiated at a classifier, and creates a unique service path for the service chain, wherein the unique service path includes the service chain and the classifier at which the service chain is instantiated.

20 Claims, 5 Drawing Sheets

DYNAMIC SERVICE PATH CREATION

TECHNICAL FIELD

The present disclosure relates to network service chains and service paths.

BACKGROUND

Network services are widely deployed and essential in many networks. In many cases, services are provided by chains of independent service functions that follow an ordered sequence of execution. The services provide a range of functions such as security, wide area network (WAN) acceleration, firewall services, and server load balancing. Service functions that form part of the overall service may be physically located at different points in the network infrastructure, such as the wide area network, data center, campus, and so forth.

Current network service deployment models are relatively static, and bound to topology for insertion and policy selection. Furthermore, they do not adapt well to elastic service environments enabled by virtualization. New data center network and cloud architectures require more flexible network service deployment models.

DESCRIPTION OF EXAMPLE EMBODIMENTS

Overview

Presented herein are techniques for dynamic creation of a unique service path for a service chain. In one example, a service controller and a plurality of service nodes are provided, each service node configured to apply a service function to traffic that passes through the respective service node. The service controller defines a service chain identifying a set of service functions and an order in which they are applied and receives an indication that the service chain has been instantiated at a classifier. The service controller then creates a unique service path for the service chain, wherein the unique service path includes the service chain and the classifier at which the service chain is instantiated.

Example Embodiments

A "service chain" is a data structure defining a set of service functions (services) and the order in which the service functions should be applied to selective traffic (packets/frames). The service functions may include, for example, services such as firewall, load balancing, network address translation (NAT), deep packet inspection (DPI), intrusion detection service (IDS), etc. and are executed at network nodes referred to herein as service nodes.

Service chaining primarily involves the interception of traffic and steering the traffic through the service chain (i.e., the ordered set of service functions). The traffic is intercepted through the use of a classifier function at a network node that servers as a head-end node to the service chain. The network node that executes the classifier function is sometimes referred to herein as a "classifier." In general, the traffic is steered from the classifier through the service functions using Layer 2 (L2)/Layer 3 (L3)/Layer 4 (L4) service overlays in the network. The service overlays enable the carrying of service metadata in addition to the original traffic as the payload.

The service chain and the corresponding forwarding state is defined, maintained and distributed by a central control-plane entity, referred to herein as a service controller. The service controller is configured to establish a binding between the forwarding state and the service chain. This mapping of the forwarding state to the service chain is referred to herein as the "service path." Each individual service function referenced by the service chain may be deployed at multiple locations and, as such, each service chain may be executable through one or more independent service paths.

In conventional service chaining schemes, construction of service paths is very static and the service path does not account for the classifier (i.e., the head-end node performing the classification). That is, the service path ultimately realized does not account for the classifier, but rather only the service nodes hosting the service functions. As a result, the service path is the same as the service chain and the service path, by itself, is insufficient to identify the classifier that initiates the service.

More specifically, in conventional schemes the service chain is an ordered set of service nodes, where each service node hosts one or more service functions. For example, a conventional scheme describes a service chain as:

$$\text{Service-chain}_{20} = \{\text{service-node}_1, \text{service-node}_2, \text{service-node}_3\},$$

where a service node is described as:

$$\text{Service-node}_1 = \{\text{Network Location(IP/MAC)}, \text{segment}_{10}, \ldots\}.$$

In such conventional schemes, the service path then is the same as the service chain:

$$\text{Service-path}_1 = \text{Service-chain}_{20}$$

Additionally, in such schemes the control plane pushes the service path (e.g., Service-path$_1$ defined as shown above) to the classifier and the service nodes. The traffic steered on such a service path carries the identification information (path identifier and sequence number) in the service header, which is used to derive the classifier location (e.g., the Internet Protocol (IP), Media Access Control (MAC) address, or a control plane allocated identifier that maps to the network address of the classifier). The above described service chain is then instantiated in multiple classifiers across the network as:

$$\text{Service-chain}_{20}@\text{Classifer}_1 = \text{service-path}_1$$

$$\text{Service-chain}_{20}@\text{Classifer}_2 = \text{service-path}_1,$$

where the service forwarding for service-path$_1$ is:

$$@\text{service-node}_1 = \{\text{service-node}_2\}$$

$$@\text{service-node}_2 = \{\text{service-node}_3\}$$

$$@\text{service-node}_3 = \{\text{null}\}.$$

As can be seen from the above example, when the same service chain is instantiated at multiple classifiers, the service paths for those service chains remain the same on all classifiers. In other words, in conventional schemes there is no distinction between a service path and a service chain, even if the service chains are instantiated at different classifiers.

However, identification of the classifier at the head-end of a service path is generally needed in L2 forwarding schemes and most L3 forwarding schemes so that the end service node (i.e., the last service node in the service chain), and sometimes intermediate service nodes (i.e., service nodes between the classifier and the end service node) can return traffic back to the classifier. Classifier identification is also used to enable advanced functionality such as Operations, Administration, and Maintenance (OAM) to pass OAM-specific data back to the classifier, classifier identification to derive the virtual routing forwarding (VRF) state for forwarding packets to the original destination in the network, for prevention of loops for steered traffic, etc. As such, conventional schemes require that the classifier identification information be explicitly carried in an overlay header. Accordingly, in the above example, when the last service node (i.e., service-node$_3$) finishes servicing the traffic, it uses the classifier identification received in the service header to return the traffic back to the classifier for forwarding.

Presented herein are techniques that provide a distinction between the service chain and the service path (i.e., a distinction between the service chain and the actual forwarding path that is used to realize the service chain). The techniques presented herein provide a new method of building a service path by decoupling the service chain and the forwarding state as well as accounting for the classifier in the forwarding state.

More specifically, the techniques presented herein dynamically construct the service path data structure to identify (include) the head-end classifier and the service chain. This is in contrast to conventional arrangements in which the service path only identifies the service chain. In this way, the techniques presented herein eliminate the need to carry the classifier identification information in the overlay header. Service paths constructed in this fashion work in all network environments, including the distributed switching environments.

In accordance with examples presented herein, the service chain within the service path may remain as a list of the service nodes or the service chain may be modified to decouple the service functions from service nodes. That is, in certain examples, the service function is not an order list of service nodes, but rather is an ordered list of service types or names that may then each be mapped to on or more service nodes. In this way, multiple nodes may exist for the same service function. In such examples, a service chain may comprise:

service-chain$_{20}$={service$_1$,service$_2$,service$_3$}, where:

service$_1$={service-node$_{1a}$,service-node$_{1b}$, ... }, service$_2$={service-node$_{2a}$,service-node$_{2b}$, ... }, and service$_3$={service-node$_{3a}$,service-node$_{3b}$, ... }.

In the techniques presented herein, construction of the service path is deferred until the instantiation of the service chain or as long as the forwarding state is not known. That is, the service path is not created until a service chain is instantiated at (i.e., bound to) a classifier. The instantiation or binding of a service chain to a classifier means that the service chain will begin at that classifier (i.e., the classifier is the head-end node for the service chain). When the service chain is instantiated at a classifier, the forwarding-state becomes known and the service-path is constructed in the network as:

Service-chain$_{20}$@Classifier$_1$=service-path$_2$

Service-chain$_{20}$@Classifier$_2$=service-path$_3$ where the Service forwarding for service-path2 is:

@Classifier$_1$={service-node$_1$,Classifier$_1$}

@service-node$_1$={service-node$_2$,Classifier$_1$}

@service-node$_2$={service-node$_3$,Classifier$_1$}

@service-node$_3$={null,Classifier$_1$}, and where the service forwarding for service-path$_3$ is:

@Classifier$_2$={service-node$_1$,Classifier$_2$}

@service-node$_1$={service-node$_2$,Classifier$_2$}

@service-node$_2$={service-node$_3$,Classifier$_2$}

@service-node$_3$={null,Classifier$_2$}

In accordance with the techniques presented herein, the service forwarding information is now a tuple {next-hop-service-node, classifier}. Additionally, the techniques enable every service node to have the ability to forward the traffic (both original and OAM) not only to the next hop, but also to the classifier. Furthermore, original traffic is not required to carry the classifier information in the overlay header. This reduces the overhead, which is expensive specifically in the case of Internet Protocol version 6 (IPv6) addresses. The construction of the tuple, as well as mapping of the classifier to its network address, is done in the central control plane (service controller).

In accordance with the techniques presented herein, the service paths are dynamic and are fully decoupled from the service chains. The service chains can now be reused at different classifiers. The service paths themselves are unique (unlike conventional arrangements) and truly identify the forwarding path used for steering the traffic. Furthermore, the service-paths created in accordance with the techniques presented herein provide a mapping back to the classifier for any service in the path to return the original traffic as well OAM data.

Figure 1:
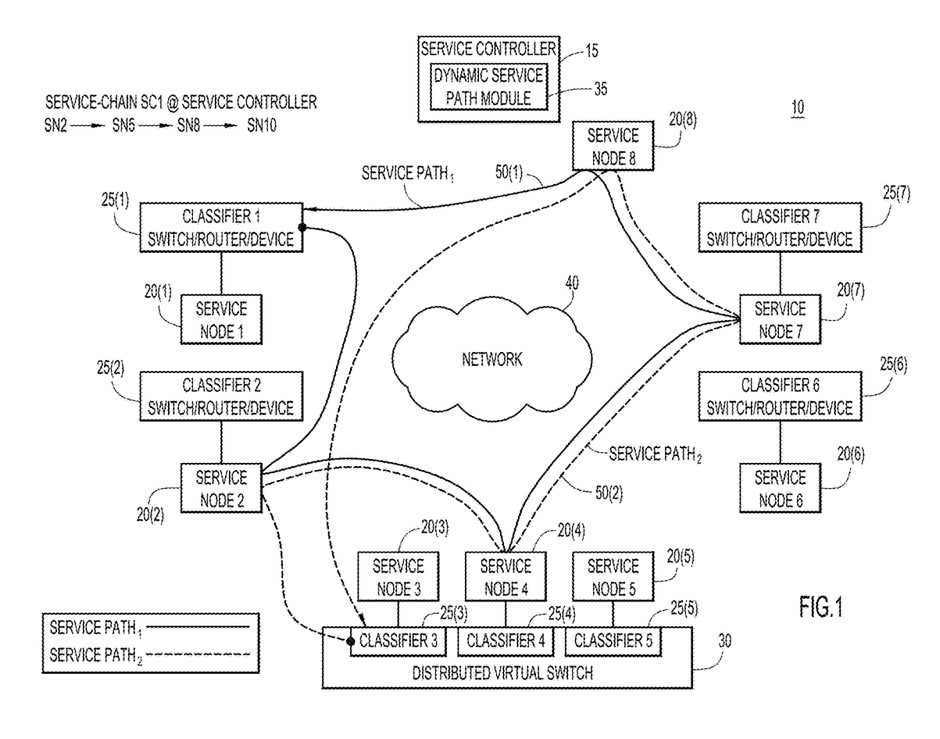
FIG. 1 is an example block diagram of a computing arrangement configured to execute dynamic service path creation techniques in accordance with examples presented herein.

FIG. 1 is a block diagram of a computing system 10 in which unique service path creation techniques in accordance with examples presented herein may be executed. In the example of FIG. 1, computing system 10 comprises a service controller 15, a plurality of service nodes 20(1)-20(8), a plurality of classifiers 25(1)-25(7), and a distributed virtual switch 30. The service controller 15 includes a dynamic service path module 35. The service controller 15, service nodes 20(1)-20(8), classifiers 25(1)-25(7), and distributed virtual switch 30 are connected (directly or indirectly) to a network 40 (e.g., a local area network (LAN), a wide area network (WAN) (e.g., the Internet), etc.). For ease of illustration, the connections of the various elements of computing system 10 to network 40 have been omitted from FIG. 1. Because the components of system 10 are connected to the network 40, the entirety of system 10 is sometimes referred to herein as a computing network or simply network.

In the example of FIG. 1, classifiers 25(1), 25(2), 25(6), and 26(7) are stand-alone network nodes (e.g., switches, routers, etc.). The classifiers 25(3), 25(4), and 25(5) are implemented as part of distributed virtual switch 30. The service nodes 20(1)-20(8) may be stand-alone devices (i.e., a device dedicated to a specific service function) or implemented as part of another device (e.g., as part of a general purpose switch, router, server, etc.)

FIG. 1 illustrates the creation and use of two service paths, shown as service path 50(1) (service path$_1$) and service path 50(2) (service path$_2$). The service path 50(1) is instantiated at classifier 25(1) and includes a service chain defined as service nodes 20(2), 20(4), 20(7), and 20(8). Service path 50(2) is instantiated at classifier 25(3) and includes the same service chain defined as service nodes 20(2), 20(4), 20(7), and 20(8).

Figure 2:
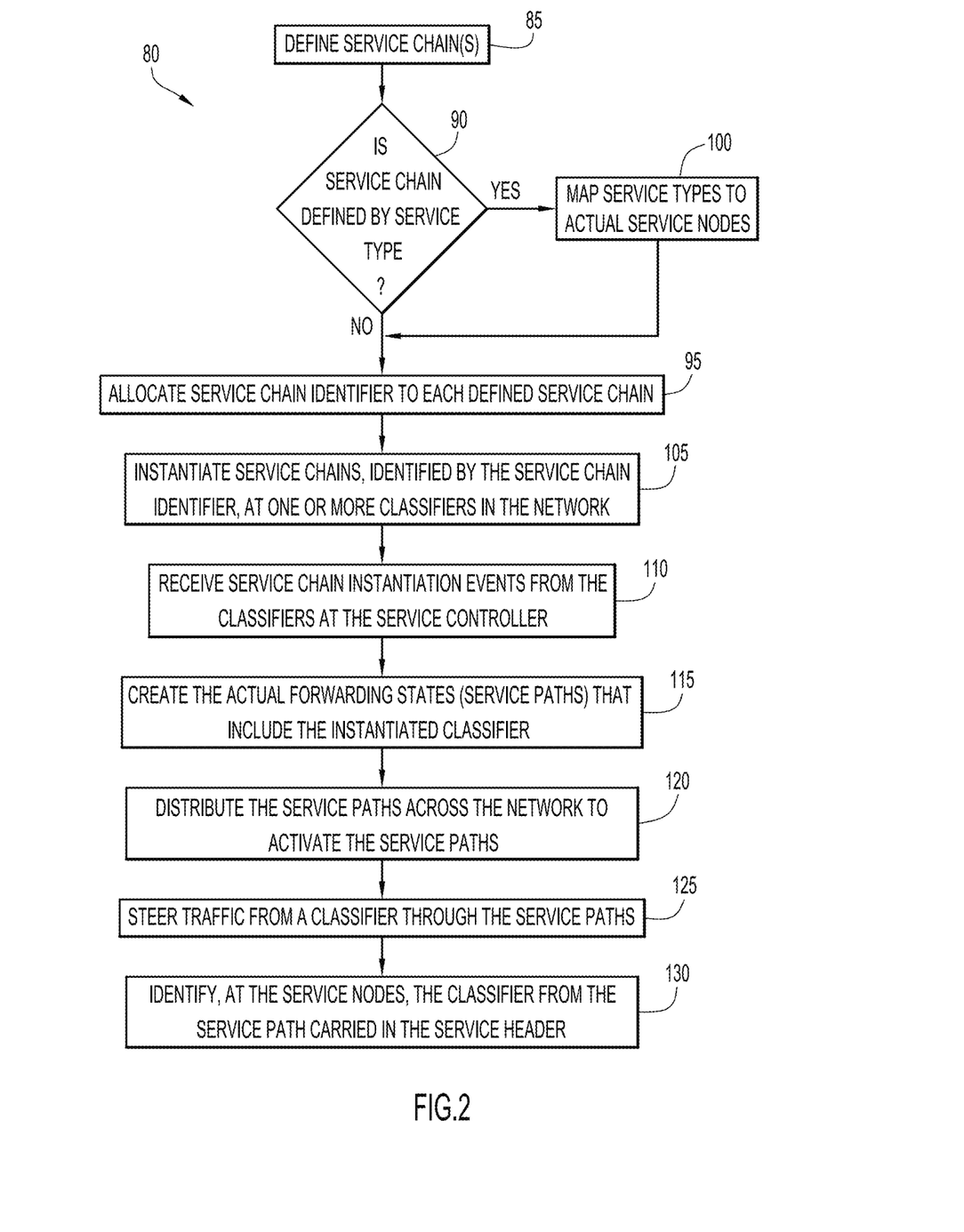
FIG. 2 is a detailed flowchart of a method for the creation and subsequent use of service paths in accordance with examples presented herein.

FIG. 2 is a detailed flowchart of a method 80 for the creation and subsequent use of service paths in accordance with examples presented herein. For ease of reference, the method 80 will be described herein reference to the network of FIG. 1.

Method 80 begins at 85 where the service controller 15 (i.e., dynamic service path module 35) defines one or more service chains. As noted above, the service chains may be defined as a list of the service nodes with strict ordering or may be defined with one or more service types with strict ordering. As noted above, when defined as service types, the service functions are decoupled from the service nodes and the ordered list of service types may then be mapped to an ordered list of service nodes. As such, at 90, the service controller 15 determines whether the service chain is defined by service types or defined by service nodes. If the service chain is defined by service nodes, the method 80 proceeds to 95. However, if the service chain is defined by service types, the method 80 proceeds to 100 where the service controller maps the service types to actual service nodes. After this mapping, the method 80 proceeds to 95.

At 95, the service controller 15 allocates a service chain identifier to each defined service chain. At 105, the service chains are instantiated at one or more classifiers. The service chains may be, for example, instantiated through one or more policy actions. As noted above, the same service chain may be instantiated at a plurality of classifiers. This is the case in the example of FIG. 1 where the same service chain (service nodes 20(2), 20(4), 20(7), and 20(8)) is instantiated at classifier 25(1) and classifier 25(3).

At 110, the service controller 15 receives service chain instantiation events from the classifiers 25(1) and 25(3). That is, the service controller 15 receives notifications indicating that the same defined service chain has been instantiated at both of the classifiers 25(1) and 25(3).

At 115, the service controller 15 creates the actual forwarding states (service paths) for the service chains instantiated at the classifiers 25(1) and 25(3). The service paths identify (include) not only the defined service chain, but also the instantiated classifier. As such, in the specific example of FIG. 1, the service controller 15 creates two service paths, namely service path 50(1) that includes classifier 25(1) and the service chain (i.e., service chain of service functions applied at service nodes 20(2), 20(4), 20(7), and 20(8)) and service path 50(2) that includes classifier 25(3) and the identical service chain.

At 120, the service controller 15 distributes the service paths 50(1) and 50(2) across the network 40 to activate the service paths. In general, the service paths 50(1) and 50(2) are distributed to the respective classifier and the service nodes in the service chain. At 125, traffic received at one of the classifiers 25(1) or 25(3) may be intercepted and steered through the respective service path (i.e., the service path 50(1) or 50(2) defined to include the subject classifier). In contrast to conventional arrangements, traffic is steered through the service paths 50(1) or 50(2) without carrying an identification of the classifier in the overlay header. Instead, the service path identifier carried in the service header identifies the associated head-end classifier. At 130, a service node may use the service path identifier to identify the classifier for the purposes of OAM, service path completion, etc.

Figure 3:
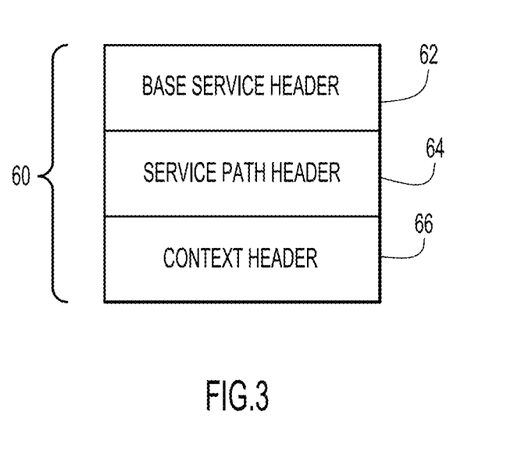
FIG. 3 is a schematic diagram of a service header in accordance with examples presented herein.

FIG. 3 is a schematic diagram of a service header, such as a network service header (NSH). The NSH is a data plane header added to frames/packets and contains information required for service chaining, as well as metadata added and consumed by network nodes and service functions. The NSH provides path information (i.e. service-path), location information (i.e. where the packet is in the service path) and opaque metadata. Thus, the NSH forms a service plane. The packets and the NSH are then encapsulated in an outer header (overlay header) for transport.

In FIG. 3, the NSH is shown at reference numeral 60 and includes a base service header 62, a service path header 64, and a context header 66. The base service header 62 provides information about service forwarding, including service chain information, and is used by participating nodes to determine correct service path selection and forwarding as well as loop detection. The service path header 64 identifies the unique service path (i.e., the service chain and the head-end classifier) and participating nodes use this identifier for path selection. The context header 66 is used to provide data plane state information, and in particular to signal service function state requirements. Because the service header 60 identifies the head-end classifier (i.e., the classifier at the start of the associated service chain), there is no longer a need for an overlay header (added to the NSH 60) to carry information identifying the head-end classifier.

Figure 4:
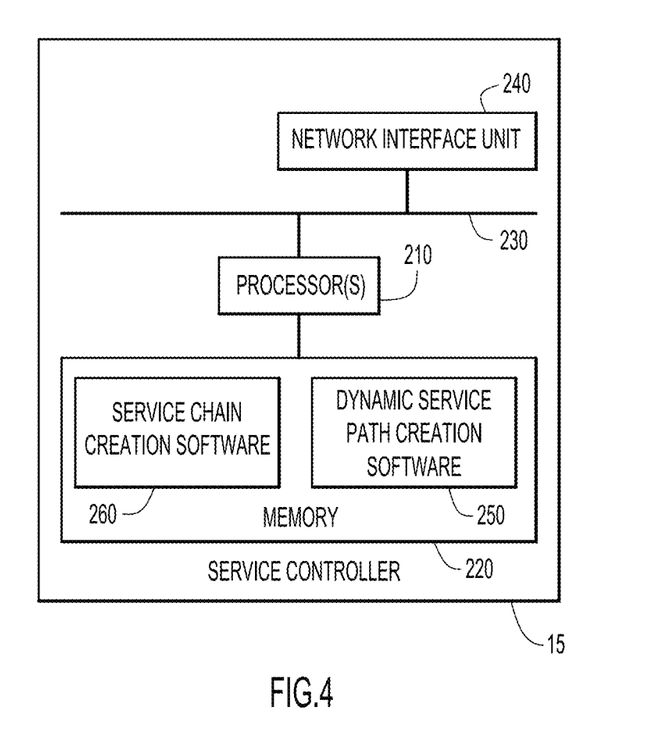
FIG. 4 is an example block diagram of a service controller configured to execute dynamic service path creation techniques in accordance with examples presented herein.

As noted above, service chains and unique service paths are created herein using a centralized controller function (service controller 15) and pushed out to each network node before traffic is allowed to flow through the service chain. The information pushed by the service controller 15 includes not only the details of the service chain data structures, but also the state information necessary for successful packet forwarding. FIG. 4 is an example block diagram of a controller configured to perform the operations described herein for service controller 15. It should be understood that a virtual controller would be a software-emulated or virtualized version of what is shown in FIG. 4, such as software running on commodity hardware in a data center. The service controller 15 includes one or more processors 210, memory 220, a bus 230 and a network interface unit 240. The processor 210 may be a microprocessor or microcontroller. The network interface unit 240 facilitates network communications between the service controller 15 and network nodes (e.g., classifiers, service nodes, etc.). The processor 210 executes instructions associated with software stored in memory 220. Specifically, the processor 210 stores dynamic service path creation software 250 that, when executed by the processor 210, causes the processor 210 to perform the service path creation operations described herein. The memory 220 also stores a service function database 260 that contains data about the service functions active on each of the service nodes, and attributes about those service functions.

The memory 220 may comprise read only memory (ROM), random access memory (RAM), magnetic disk storage media devices, optical storage media devices, flash memory devices, electrical, optical, or other physical/tangible memory storage devices. In general, the memory 220 may comprise one or more tangible (non-transitory) computer readable storage media (e.g., a memory device) encoded with software comprising computer executable instructions and when the software is executed (by the processor 210) it is operable to perform the operations described herein.

Figure 5:
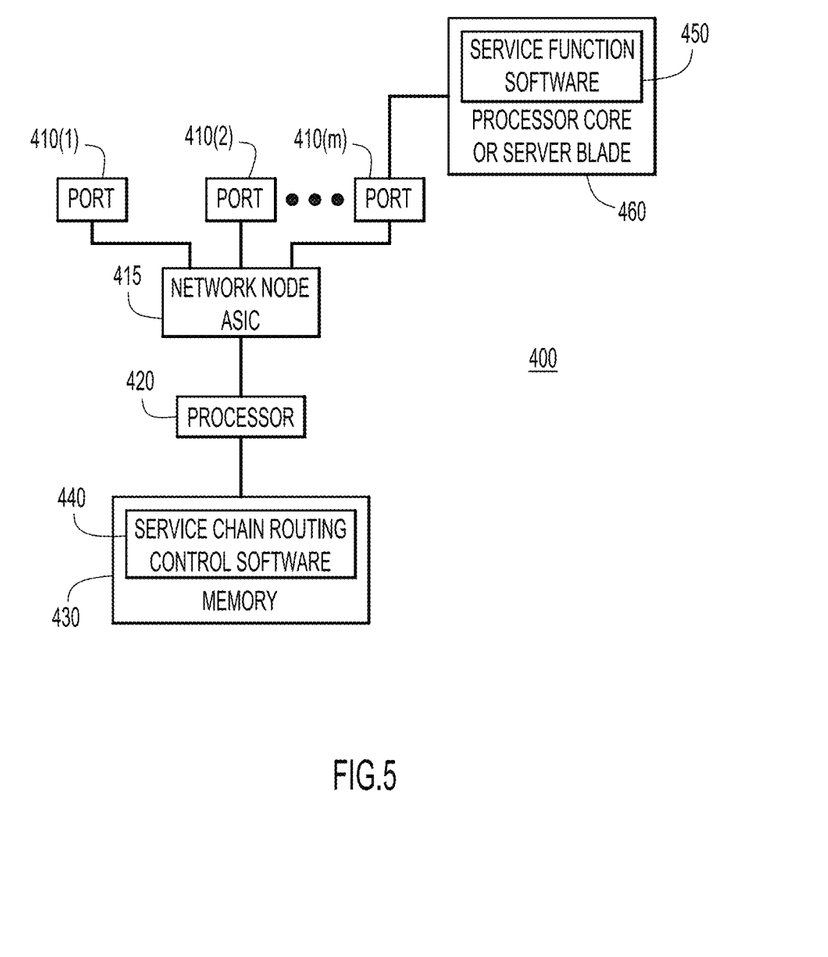
FIG. 5 is an example block diagram of a network node configured in accordance with examples presented herein.

FIG. 5 illustrates an example block diagram for a network node, e.g., a switch, router, gateway, etc., configured to perform the operations described herein for a classifier or service node. It should be understood that a virtual network node would be a software-emulated or virtualized version of what is shown in FIG. 5. The network node 400 comprises a plurality of ports 410(1)-410(m), a network Application Specific Integrated Circuit (ASIC) 415, a processor or central processing unit (CPU) 420 and memory 430. The ports 410(1)-410(m) receive ingress packets and output egress packets from the network node. The network node ASIC 415 directs incoming packets to ports for egress according to logic as well as controls from the processor 420. For example, if the network node is a router, then the ASIC 415 is a router ASIC configured for network routing functions, and if the network node is a switch, then the ASIC 415 is a switch ASIC configured for network switch functions. The processor 420 is a microprocessor or microcontroller, for example, and executes instructions for the service chain routing control firmware/software 440 stored in memory 430. The service chain routing control firmware/software 440 includes instructions that, when executed by the processor 420, cause the processor to perform the operations described herein in for a classifier or service node.

In certain examples, the network node 400 is a service node that performs service functions. The operations of a service function associated with such a network node 400 are implemented by service function software 450 running on a processor core or server blade 460 that is in communication with a port, e.g., port 410(m), of the network node.

The memory 430 may comprise read only memory (ROM), random access memory (RAM), magnetic disk storage media devices, optical storage media devices, flash memory devices, electrical, optical, or other physical/tangible memory storage devices. In general, the memory 430 may comprise one or more tangible (non-transitory) computer readable storage media (e.g., a memory device) encoded with software comprising computer executable instructions and when the software is executed (by the processor 420) it is operable to perform the operations described herein.

Presented herein are techniques to create (construct) service paths dynamically, as opposed to existing static schemes. The techniques presented herein decouple the service path from the service chain and account for the classifier and to avoid carrying classifier identification as part of the service overlay header along with the original traffic (i.e., the classifier is learned from the controller and is not learned through the data plane). The techniques may provide advantages that include: service chain/service path decoupling, the ability to use the same service chains across a network, service paths include the classifier in addition to the service nodes that should apply the required service functions, traffic steered through the service path does not suffer from classifier identification overhead, a service node can pass OAM data back to the classifier, the unique path identifier per path identifies path and source classifier, and the return to classifier functionality allows the service overlay to interwork in the VRF aware network as the VRF forwarding state is maintained at the network devices and return to classifier is a must.

The above description is intended by way of example only.

What is claimed is:

1. A method comprising:
    at a service controller for a network comprising a plurality of service nodes each configured to apply a service function to traffic that passes through the respective service node, defining a service chain identifying a set of service functions and an order in which they are applied;
    receiving, from a classifier, an indication that the service chain has been instantiated at the classifier;
    creating a service header that identifies a unique service path for the service chain, wherein the unique service path identifies both the service chain and the classifier at which the service chain is instantiated, wherein the classifier is a head-end network node for the service chain;
    defining, at the service controller, a plurality of identical service chains;
    receiving an indication that the identical service chains have been instantiated at a plurality of different classifiers; and
    creating unique service headers for each of the identical service chains, wherein the unique service headers each identify unique service paths for a respective one of the identical service chains instantiated at each of the plurality of classifiers, wherein each of the unique service paths identifies both the service chain and the classifier at which the service chain is instantiated.

2. The method of claim 1, wherein defining the service chain comprises:
    defining the service chain as an ordered list of service nodes each configured to perform service functions for traffic passing through the service chain.

3. The method of claim 1, wherein defining the service chain comprises:
    defining the service chain as an ordered list of service types for application to traffic passing through the service chain.

4. The method of claim 3, further comprising:
    mapping the service types to specific service nodes configured to perform service functions corresponding to the service types.

5. The method of claim 1, further comprising:
    distributing information describing the unique service path to service nodes associated with the service chain and the classifier at which the service chain is instantiated.

6. The method of claim 5, further comprising:
    intercepting traffic at the classifier;
    based on the service header, steering the traffic to a first service node of the service chain; and
    identifying, at the service node, the classifier for the service chain from service path information in the service header.

7. An apparatus, comprising:
a network interface unit configured to enable communications over a network including a plurality of service nodes each configured to apply a service function to traffic that passes through the respective service node; memory; and
a processor coupled to the network interface unit and the memory, the processor configured to:
define a service chain identifying a set of service functions and an order in which they are applied,
receive, from a classifier, an indication that the service chain has been instantiated at the classifier,
create a service header that identifies a unique service path for the service chain, wherein the unique service path identifies both the service chain and the classifier at which the service chain is instantiated, wherein the classifier is a head-end network node for the service chain;
define a plurality of same service chains;
receive an indication that the same service chains have been instantiated at a plurality of different classifiers; and
create unique service headers for each of the service chains instantiated at each of the plurality of classifiers, wherein each of the unique service headers identify unique service paths for a respective one of the service chains, wherein each of the unique service paths identifies both the service chain and the classifier at which the service chain is instantiated.

8. The apparatus of claim 7, wherein the processor is further configured to:
define the service chain as an ordered list of service nodes each configured to perform service functions for traffic passing through the service chain.

9. The apparatus of claim 7, wherein the processor is further configured to:
define the service chain as an ordered list of service types for application to traffic passing through the service chain.

10. The apparatus of claim 9, wherein the processor is further configured to:
map the service types to specific service nodes configured to perform service functions corresponding to the service types.

11. The apparatus of claim 7, wherein the processor is further configured to:
distribute information describing the unique service path to service nodes associated with the service chain and the classifier at which the service chain is instantiated.

12. One or more computer readable storage media encoded with software comprising computer executable instructions and when the software is executed operable to:
at a service controller for a network comprising a plurality of service nodes each configured to apply a service function to traffic that passes through the respective service node, define a service chain;
receive, from a classifier, an indication that the service chain has been instantiated at the classifier;
create a service header that identifies a unique service path for the service chain, wherein the unique service path identifies both the service chain and the classifier at which the service chain is instantiated, wherein the classifier is a head-end network node for the service chain;
define a plurality of same service chains;
receive an indication that the same service chains have been instantiated at a plurality of different classifiers; and
create unique service headers for each of the service chains instantiated at each of the plurality of classifiers, wherein each of the unique service headers identify unique service paths for a respective one of the service chains, wherein each of the unique service paths identifies both the service chain and the classifier at which the service chain is instantiated.

13. The computer readable storage media of claim 12, further comprising instructions operable to:
define the service chain as an ordered list of service nodes each configured to perform service functions for traffic passing through the service chain.

14. The computer readable storage media of claim 12, further comprising instructions operable to:
define the service chain as an ordered list of service types for application to traffic passing through the service chain.

15. The computer readable storage media of claim 14, further comprising instructions operable to:
map the service types to specific service nodes configured to perform service functions corresponding to the service types.

16. The computer readable storage media of claim 12, further comprising instructions operable to:
distribute information describing the unique service path to service nodes associated with the service chain and the classifier at which the service chain is instantiated.

17. The computer readable storage media of claim 12, further comprising instructions operable to:
intercept traffic at the classifier;
based on the service header, steer the traffic to a first service node of the service chain; and
identify, at the service node, the classifier for the service chain from service path information in the service header.

18. The method of claim 1, wherein the service header includes a base service header, a service path header that identifies the unique service path, and a context header.

19. The apparatus of claim 7, wherein the service header includes a base service header, a service path header that identifies the unique service path, and a context header.

20. The computer readable storage media of claim 12, wherein the service header includes a base service header, a service path header that identifies the unique service path, and a context header.

* * * * *